Patented Sept. 17, 1940

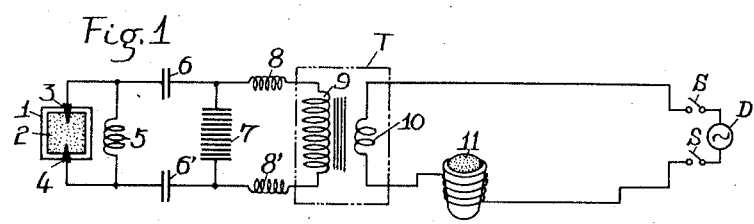
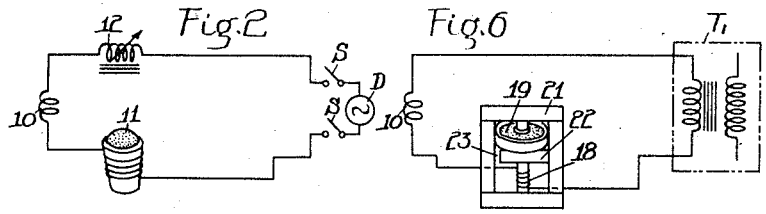
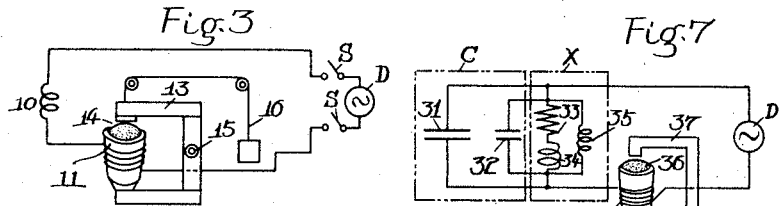
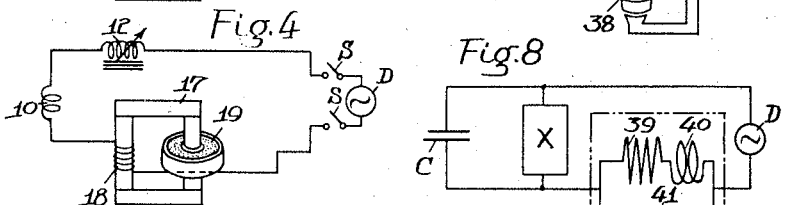
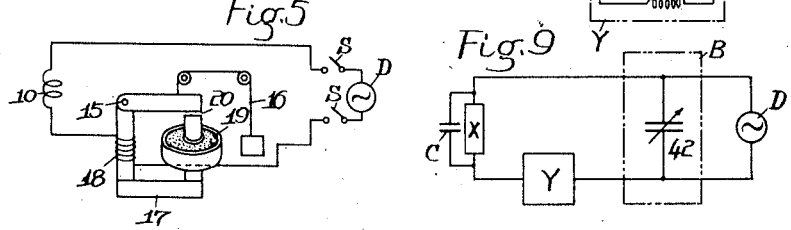

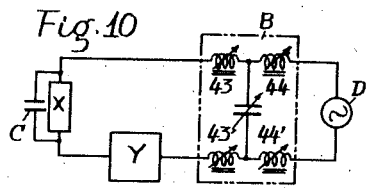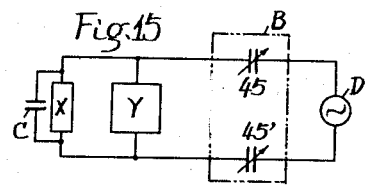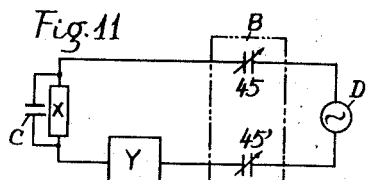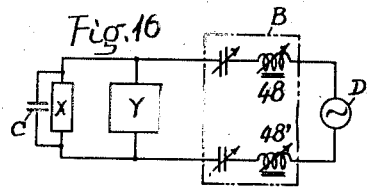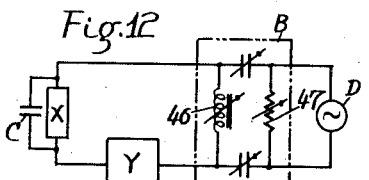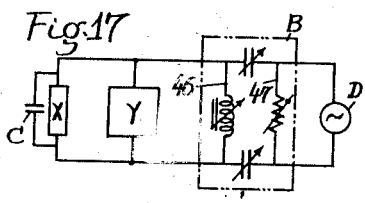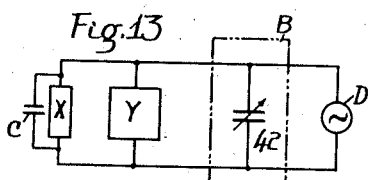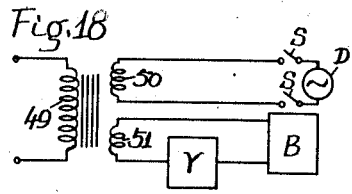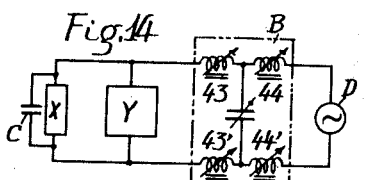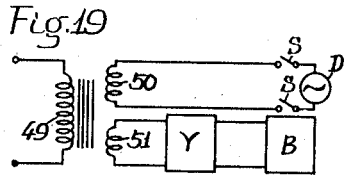

2,215,045

UNITED STATES PATENT OFFICE 2,215,045

APPARATUS EMPLOYING HIGH VOLTAGE, HIGH FREQUENCY IMPULSIVE ELECTRIC CURRENT

Hideyuki Kikuchi and Mitsutoshi Hirose, Tokyo, Japan; said Hirose assignor to said Kikuchi Application October 24, 1938, Serial No. 236,778
In Japan November 22, 1937

2 Claims. (Cl. 13—23)

Our invention relates to improvements in an apparatus adapted for metallurgy and similar fields of utilization wherein high voltage, high frequency electric current is employed. More particularly, our invention relates to the manner of utilization of the equivalent of an inductor element which is conventionally inserted in the primary circuit of the current source, and which inductor element is employed for regulation of the high frequency circuit.

In a high voltage, high frequency electric circuit such as is employed for ore-disintegration furnaces, infusing chambers, impregnating cells and the like, it is customary practice to insert an inductor element in the primary circuit of the current source, to balance, by means of the lagging current demand of such inductor element, the leading current required by the capacitative load, such as the disintegrating furnace or the like, thereby obtaining approximately unity power factor, and at the same time, to stabilize at a selected frequency, the oscillation of the high frequency current.

It is well known that the large capacity of the inductor element inserted in the primary circuit of this kind of apparatus results in wasting a large part of the electric power supply as power loss, great heat being generated within the inductor element.

According to our invention this conventional and energy-wasting inductor in the primary circuit is replaced by a device within which useful heat is generated by electromagnetic induction, the said device maintaining the required coefficient of induction of the primary circuit. If necessary, this device is complemented by a second, balancing circuit, should the device itself be not of sufficient reactance to balance the capacitative load.

An important object of our invention, therefore, is to utilize at least a part of the electric power which ordinarily is wasted at the inductor of known apparatus, and to convert it into electric heat for useful purposes, the oscillation-stabilizing and phase-balancing functions of the inductive element being retained.

In the accompanying drawings are illustrated diagrammatically circuits according to several forms of apparatus according to our invention, by way of example.

Therein, Figures 1 through 6 illustrate connections for heaters of the magnetic induction type, and having a large leakage of the magnetic flux, which heaters are employed in lieu of phase-balancing inductors, in the primary side of a high voltage-high frequency circuit, the secondary side of which is directly connected to an ore-disintegrating furnace;

Figures 7 through 12 illustrate electrical connections for the case where a balancing circuit is employed in cooperation with an induction heater, which latter is inserted in series in the primary circuit, the connection of the balancing circuit in the primary circuit being either in series or in parallel;

Figures 13 through 17 illustrate electrical connections for the case where the induction heater is inserted in parallel in the primary circuit while a balancing circuit is inserted either in series or in parallel in the same primary circuit;

While Figures 18 and 19 illustrate the connections for the case wherein the induction heater is inserted in the circuit of a third coil of a supply transformer.

In Figures 2 through 7, the secondary circuit is omitted, it being the same as in Figure 1.

Referring to Figure 1, there is shown a disintegrating furnace made of insulating materials and having a pair of carbon or other electrodes 3 and 4. Powdered raw material 2 is charged in the furnace. This raw material may in a typical instance consist of a mixture of powdered ore and one or more reducing agents, fluxes, melting agents and heating agents. For example, a mixture of 100 parts of hematite containing 40% iron, 5–10 parts of coke and 10–5 parts of coal may be charged into the furnace, the fineness of the materials being 15 mesh or more. For rich ore, it is advisable to add 10–20 parts of insulating piezo-electric crystalline substances such as $SiO_2$, $TiO_2$, $ZrO_2$, for accelerating the reaction in the disintegrating furnace.

An oscillating coil 5 and a sparking system such as a multiplate quenched spark gap 7 are inserted in parallel with the disintegrating furnace, while condensers 6, 6', high-frequency choke coils 8, 8' and the secondary coil 9 of a low or medium frequency step-up transformer T are inserted in series in the secondary circuit, to complete an oscillating circuit.

An induction heater 11 having an induction coil wound thereon is inserted in the primary circuit of the power source, such as dynamo D of a low or medium frequency; that is, from say 25 to 20,000 cycles per second. Energy is thus supplied to the primary coil 10 of the step-up transformer T.

Should the ordinary power line be availed of as the power source, a second transformer $T_1$ is employed to obtain the required voltage for the primary circuit, as shown in Figure 6.

The following constants are adopted in a typical example of the utilization of our invention in practice:

Primary input circuit

Input current at 50 cycles per second, 500 volts, and 100 kva.

When employing an inductor or range from 60 to 80 kva. demand, the device is adjusted to give 65% lagging power factor, so that the power consumption at the inductor is about 40 kw. (60 kva. × 0.65 is 39 kw.).

Secondary high voltage and high frequency circuit

Transformer secondary voltage is 50,000 volts. Main oscillating current is 300,000 cycles per second.

Equivalent capacity of the oscillating circuit in series is 0.07 micro-farad, and power consumed at the sparking device and others about 10 kw.

The distance between the electrodes at the disintegrating furnace is about 2 meters, and the furnace power demand is about 15 kw.

In general, it may be said that in operation, the voltage of the primary circuit is kept at from 200 to 800 volts, the distance between the poles 3 and 4 is adjusted to give a proper length, the electric capacity of the powdered raw material in the disintegrating furnace is selected of proper value, and the voltage, the gap length, and number of gaps of the sparking device are adjusted so that in the secondary circuit, and by consequence, in the primary circuit, also there is induced a harmonic current of higher harmonic value, say of range between the 3rd and the 15th order, in the primary circuit. Therefore, if say the 7th order harmonic current is generated for example, a multiplex frequency current of 350 cycles per second can be obtained and superposed on the primary current of fifty cycles.

It is easily understood from the foregoing explanation that if the coils wound on the coreless induction heater 11 are selected of proper size and number of turns, and if in which said heater there are charged metal grains such as paramagnetic metal of large permeability or an ordinary metal having unit permeability, this heater can be designed as an inductor of capacity as large as 60–80 kva., as contrasted with a total input of say 100 kva., and the metal in the heater can be melted by the heat generated by the electromagnetic induction due to the power loss consumed by the inductor as it carries out its power-factor regulating and oscillation-stabilizing functions. The metal can be obtained from the products of reduction in the disintegrating furnace in the secondary circuit of this device.

In Figure 2, a second, adjustable inductor 12 is provided in the primary circuit. While the electric power required to reduce the ore in the disintegrating furnace 1 and that consumed at the remelting induction heater 11 are automatically distributed in a proper ratio, varying in each instant according to the characteristic of the circuits and the progress of the reaction, due to the automatic controlling action of a high-frequency generating circuit, nevertheless the provision in the primary circuit of the adjustable inductor 12 simplifies the precise control of the power distribution.

In Figure 3 a coreless induction heater 11 forms part of a magnetic circuit 13 having a small gap 14 for the leakage of flux, this gap between the magnetic poles being adjustable by means of a hinge 15 and a counter-balance 16. This arrangement ensures that a proper induction coefficient can be obtained, so as to have the induction heater 11 work effectively.

The core type induction heater 19 shown in Figure 4 provides a closed magnetic circuit 17 and a coil 18 of the primary circuit around the core. Figure 5 illustrates a similar induction heater having a flux leakage gap 20 and a gap-adjusting device 15–16.

In Figure 6 is shown a core type induction furnace having a square lattice type core 21, and crossed arms 22 fixed therein, the furnace being mounted about one of the crossed arms and the coil of the primary circuit on another arm. An adjustable small gap 23 may be provided in one of the arms, to control the amount of leakage flux.

In Figures 7 through 13, an electromagnetic induction heater is inserted in series in the primary circuit, and is shown as cooperating with condensers, inductors and resistances which are also inserted in the primary circuit to increase the efficiency of the induction heater.

In this circuit an equivalent capacity is transferred to the primary circuit, this equivalent capacity of the secondary circuit being shown at 31, and a distributed capacity 32 is illustrated in the step-up transformer and other devices. The combined capacity of 31 and 32 is shown by the character C on the drawings.

The effective resistance consumed in the resisting elements of the high-frequency disintegrating furnace and other devices is indicated at 33 while numerals 34 and 35 denote equivalent inductions due to the inductance of the main oscillating coil and the leakage flux of the transformer, respectively. The combined effect of these members is shown by an equivalent impedance X on the drawings. Numerals 36, 37 and 38 denote an induction heater, a magnetic path, and a coil wound on the heater, respectively.

In Figure 8 a resistance 39 and inductances 40 and 41 in the equivalent circuits corresponding to the induction heater are shown. The combined effect is denoted by an equivalent impedance Y.

In Figures 9 through 19, B represents a balancing circuit inserted in the primary circuit, of impedance such that the power factor of the entire system can be brought as close to unity as possible.

Various examples of the balancing circuit are illustrated in Figures 9 through 19, wherein is shown an adjustable parallel condenser 42; adjustable series inductors 43, 43', 44 and 44'; adjustable series condensers 45 and 45'; adjustable inductors 46, 48 and 48'; and an adjustable resistance 47.

In Figures 18 and 19, the induction heater is inserted in the third circuit or tertiary winding 51 of a main transformer 49—50—51. In these instances the induction heater circuit Y which is in parallel or series with the balancer B in the third circuit 51, receives a part of the electric power supply when the disintegrating furnace in the secondary circuit is operating to reduce the powdered ore.

The switch S in the primary circuit is closed and opened repeatedly. In a typical example it is closed for nine minutes, corresponding to the operating type of the high voltage, high frequency disintegrating furnace, being opened for one minute.

It is preferable that several sets, each consisting of a sparking device and a high frequency disintegrating furnace, be prepared for each induction heater, to be used alternately therewith, whereby the necessity of prolonging the switching-off period can be minimized.

While in the foregoing explanation, my invention is described with respect to its application to an ore-disintegrating furnace by way of example, it is also applicable to other fields, such as an infusing bath for dying, cocoon boiling, leather tanning and other fields of industry, where high voltage, high frequency electric currents are directly used, and where other types of induction heaters and high-frequency generator circuits can be employed, modified according to the needs of the art or industry to which they are to be applied.

I claim:

1. In an electrical system, a high-voltage, high-frequency, low-current, capacitative electrical furnace; a source of electrical supply therefor; a step-up transformer in the supply line of said source; a primary and a secondary for said transformer; tunable means in the secondary, high-tension side of said transformer, the said tunable means and the said capacitative furnace being in the same tunable circuit and producing regulatable oscillation current conditions in said circuit; the energy supply to said capacitative furnace, with respect to voltage, current and frequency being regulatable within wide limits, and the said capacitative furnace demanding a leading power factor; a low-voltage, low-frequency, high-current, inductive furnace, and a tunable balancing circuit in the low-tension, primary side of said transformer, the said balancing circuit being tunable within wide ranges as to frequency, voltage and current, and the said inductive furnace demanding a lagging power factor, the said capacitative and inductive furnaces being operable simultaneously, and the reactances of the two furnaces, together with their tunable circuits, being regulatable with respect to each other within wide limits, in accordance with load conditions and power factor requirements, to produce nearly unity system power factor, and to stabilize the oscillation of the capacitative furnace circuit.

2. In an electrical system, a high-voltage, high-frequency, low-current capacitative working load; a source of electrical supply therefor; a transformer in the supply line of said source; a primary and a secondary for said transformer; tunable means in said secondary, in circuit with sair capacitative load, for producing resonant and oscillating current conditions in said capacitative load; the energy supply to said capacitative load, in respect to voltage, current and frequency, being regulatable within wide limits, and the said capacitative load demanding a leading power factor; a low-voltage, low-frequency, high-current inductive working load in the primary of said transformer, and demanding a lagging power factor, the said inductive load having a small adjustable air-gap in its flux path for regulation of the leakage flux; the primary circuit, including said inductive load, being tunable both to frequency, voltage and current, the said capacitative and inductive loads being operable simultaneously, and the reactances of the said two loads being regulatable with respect to each other within wide limits in accordance with load conditions and power factor requirements, to produce nearly unity system power factor, and to stabilize the oscillation of the capacitative load circuit.

HIDEYUKI KIKUCHI.
MITSUTOSHI HIROSE.